United States Patent [19]

Finkelstein et al.

[11] Patent Number: 5,057,365
[45] Date of Patent: Oct. 15, 1991

[54] CAP LINER AND PROCESS FOR USING CAP LINER TO SEAL CONTAINERS

[75] Inventors: Harvey Finkelstein, Mahwah; C. Walter Burgess, Somerville, both of N.J.

[73] Assignee: 501 Tri-Seal International, Inc., Blauvelt, N.Y.

[21] Appl. No.: 378,763

[22] Filed: Jul. 12, 1989

[51] Int. Cl.$^5$ .................... B32B 7/12; B32B 15/12
[52] U.S. Cl. .................... 428/344; 428/347; 428/349; 428/352; 428/354; 428/464; 428/516
[58] Field of Search .................... 428/461, 349, 347, 45, 428/172, 344, 355, 352, 354, 516, 464

[56] References Cited

U.S. PATENT DOCUMENTS

| | | | |
|---|---|---|---|
| 3,928,109 | 12/1975 | Pollock et al. | 428/45 X |
| 4,650,082 | 3/1987 | Paciorek | 428/172 X |
| 4,778,698 | 10/1988 | Ou-Yang | 428/349 X |
| 4,880,701 | 11/1989 | Gibbons et al. | 428/46 X |
| 4,917,949 | 4/1990 | Yousif | 428/349 |

Primary Examiner—Thomas J. Herbert
Attorney, Agent, or Firm—Laubsacher, Presta & Laubcher

[57] ABSTRACT

The present invention provides a process for hermetically sealing a container having an open top. The process of this invention employs a novel cap liner comprising a backing layer consisting of thermoplastic material, a sealing layer and a bond layer between the backing layer and the sealing layer. The process comprises the steps of: providing a cap adapted to engage the open top of a container; providing a novel cap liner of this invention; inserting the cap liner into the cap; securing the cap to the container such that the sealing layer of the cap liner contacts the container and extends across the open top of the container; and bonding the sealing layer of the cap liner to the container to produce a hermetically sealed container.

5 Claims, 2 Drawing Sheets

CAP LINER AND PROCESS FOR USING CAP LINER TO SEAL CONTAINERS

BACKGROUND OF THE INVENTION

Tamper-resistant hermetically sealed containers are well known in the packaging art. Such hermetically sealed containers can be produced by providing a cap with a cap liner, securing the cap to a container and subjecting the capped container to an induction field thereby sealing a portion of the cap liner across the top of the container. Typically the cap liner in the cap is a laminated structure wherein the laminate layer secured across the top of the container is a metallic foil or ply coated with a heat activated sealant. After the metallic foil has been secured to the container to provide a hermetic seal, the cap is removed from the container and the remainder of the laminated cap liner is retained in the cap for resealing the container after the hermetic seal is broken.

Known cap liners used in producing hermetically sealed containers suffer from a number of disadvantages. Wax laminated cap liners are subject to delamination and thus, part or all of the cap liner which should remain in the cap may fall out of the cap. If the cap liner does delaminate, the cap liner may be rendered ineffective for sealing the container. After removal of the foil seal, delamination of the cap liner can result in contamination of the container contents or can result in physical degradation of the container contents by allowing exposure of the contents to air and moisture due to insufficient resealing of the container by the delaminated cap liner. Failure of the cap liner to remain in the cap is also annoying to consumers of the container's contents, and it is likely that a consumer would merely discard a cap liner which has fallen out of the cap. A cap without a cap liner may not adequately reseal the container.

One example of a cap liner used to produce a hermetically sealed container is a cap liner having a pulpboard backing, a wax coating, aluminum foil and a heat sealable film coating. The pulpboard backing having a wax coating is retained in the cap after sealing of the container. The pulpboard backing often falls out or is pulled out of the cap and thus prevents adequate resealing of the container after the hermetic seal has been broken. If it remains in the cap, the pulpboard backing frequently becomes saturated with product, disintegrates and falls into the container, thereby contaminating the product. Another example of a cap liner useful in producing a hermetically sealed container is disclosed in U.S. Pat. No. 3,928,109. In this patent, the cap liner comprises a metallic-non-metallic-metallic laminate. One of the metallic plys is bonded to a container upon exposure of the cap container to an induction field. Since the cap liner of U.S. Pat. No. 3,928,109 requires three plys, there are usually four bonding layers associated with this cap liner. The relative bonding strengths of these bonding layers must be carefully controlled or delamination of the cap liner will result. Preparation of the multi-layer laminate of U.S. Pat. No. 3,928,109 can be time-consuming and expensive. In addition, the presence of at least three plys in the cap liner laminate provides many potential delamination sites.

OBJECTS OF THE INVENTION

It is, therefore, an object of the present invention to provide a process for producing a hermetically sealed container which is free of the disadvantages of known processes.

Another object of the present invention is to provide a cap liner which is free of the disadvantages of known cap liner.

It is a further object of the present invention to provide a cap liner which is not subject to delamination.

It is yet another object of the present invention to provide a process for producing a hermetically sealed container which process uses a novel cap liner of the present invention.

Still another object of the present invention is to provide a liner retained in the cap for reseal that will not delaminate, absorb moisture, allow gas permeation or in any way contaminate the product.

SUMMARY OF THE INVENTION

According to the present invention there is provided a method for producing a hermetically sealed container, which method comprises the steps of:

I. providing a cap liner adapted to be received within a cap, said cap liner comprising a backing layer, a sealing layer with a bond layer between the backing layer and the sealing layer, said backing layer consisting of thermoplastic material;

II. inserting the cap liner into the cap such that the backing layer is adjacent to the end wall of the cap;

III. securing the cap to the container such that the sealing layer of the cap liner contacts the container lip and extends across the open top of the container; and IV. bonding the sealing layer of the cap liner to the container to produce a hermetically sealed container.

In accordance with another aspect of the present invention there is provided a novel cap liner comprising a backing layer and a sealing layer with a bond layer between the backing layer and sealing layer. The backing layer of the cap liner of the present invention consists of an extruded or coextruded thermoplastic material which is not subject to delamination. The sealing layer comprises a material capable of being bonded to the container and providing a hermetic seal for the container.

BRIEF DESCRIPTION OF THE DRAWINGS

The present invention can be further understood with reference to the following drawing figures wherein.

DETAILED DESCRIPTION OF THE INVENTION

Figure 1:
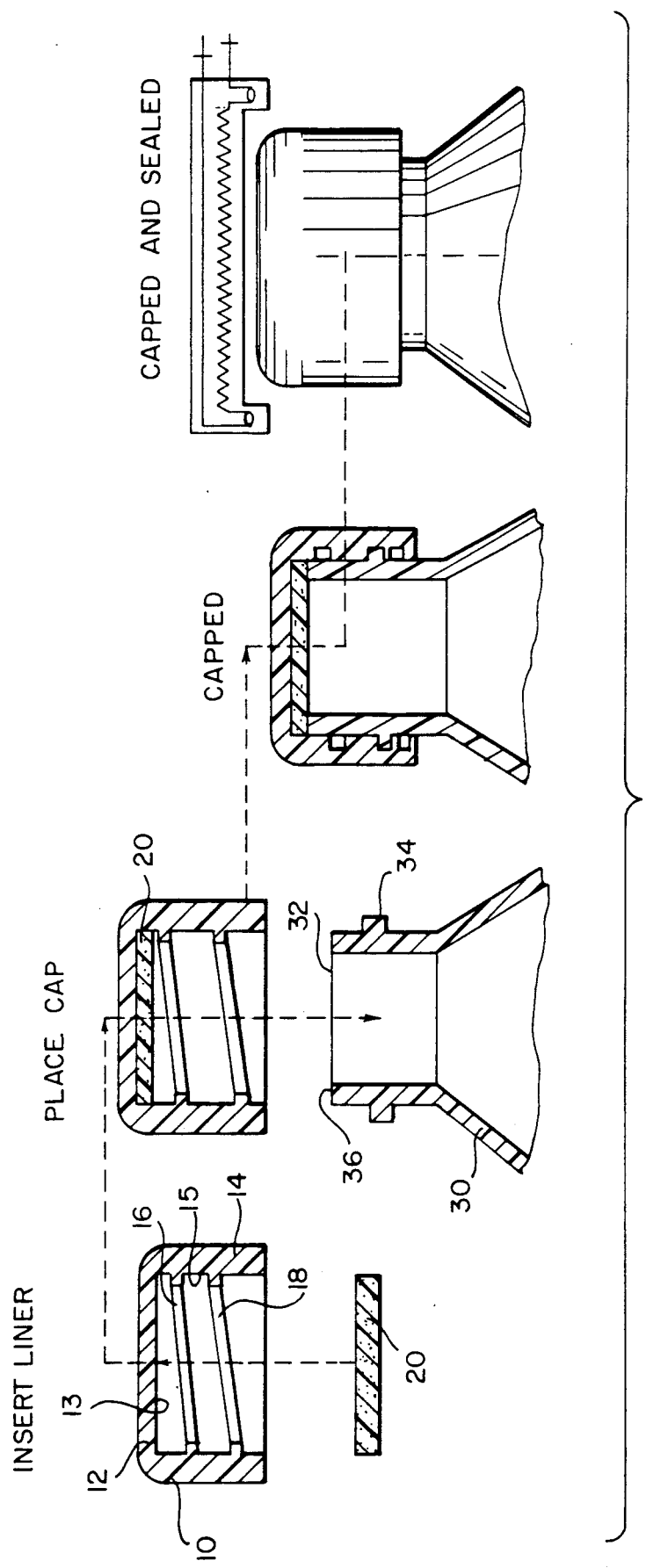
FIG. 1 illustrates the process of the present invention.

Referring now to FIG. 1, there is illustrated the process of the present invention. As shown in FIG. 1, a cap 10 has an end wall 12 and peripheral side wall 14. The inner surface 15 of the peripheral side wall 14 is provided with means to matingly engage a container such as the container 30. Any suitable means may be provided in the cap 10 for matingly engaging a container 30 such as, for example threads 16, 18. The process of this invention comprises providing a cap liner 20 which is adapted to be received within the cap 10. The cap liner 20 comprises a backing layer 22, a sealing layer 24 and a bond layer 26 positioned between the backing layer 22 and the sealing layer 24. The backing layer 22 consists of an extruded or coextruded thermoplastic material.

As shown in FIG. 1, the cap liner 20 is inserted into the cap 10 such that the backing layer 22 of the cap liner 20 is positioned adjacent to the inner surface 13 of the end wall 12. The cap 10 is secured to the container 30 by mating the threads 16, 18 of the cap 10 with the threaded neck 34 of the container 30. When the cap 10 is secured to the container 30 the sealing layer 24 of the cap liner 10 contacts the upper edge 36 of the threaded neck 34 and extends across the open top 32 of the container 30. The sealing layer 24 of the cap liner 20 is then heat sealed to the container 30 to produce a hermetically sealed container. After this bonding step, the container 30 is hermetically sealed by the sealing layer 24.

Figure 2:
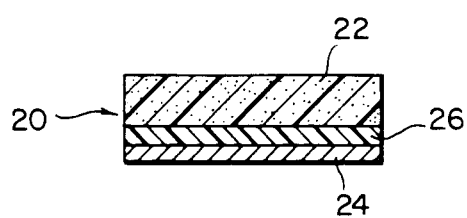
FIG. 2 is a cross sectional view of a cap liner of the present invention.
Figure 3:
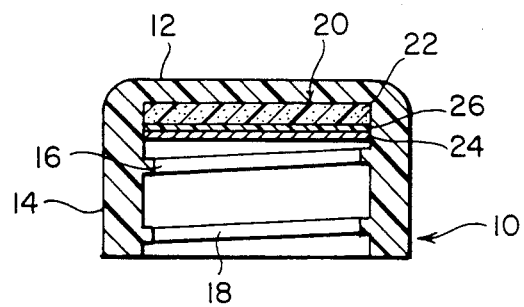
FIG. 3 is a cross sectional view of a cap having a cap liner of the present invention as the cap exists prior to sealing of the container.

Referring now to FIG. 2, there is shown a cap liner 20 of the present invention. The cap liner 20 comprises three layers, a backing layer 22, a sealing layer 24 and a bond layer 26 positioned between the backing layer 22 and the sealing layer 24. The components of the layers 22, 24 and 26 will be further discussed hereinafter. In FIG. 3, there is shown the container 30 having the cap 10 secured thereto. The cap 10 is secured to the container 30 in a known manner, such as engaging the threads 16, 18 on the inner surface 15 of the side wall 14 of the cap 10 with the threaded neck 34 of the container. When the cap 10 is secured to the container 30, the sealing layer 24 of the cap liner 20 contacts the upper edge 36 of the threaded neck 34 and extends across the open top 32 of the container 30.

Figure 4:
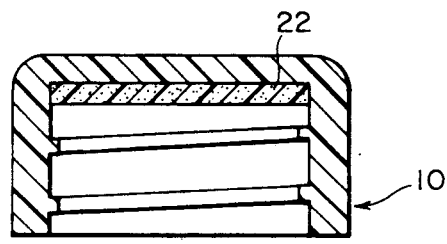
FIG. 4 is a cross sectional view of the cap and container after removal of the cap from the sealed container.
Figure 4:
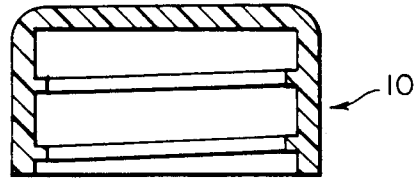
Figure 4:
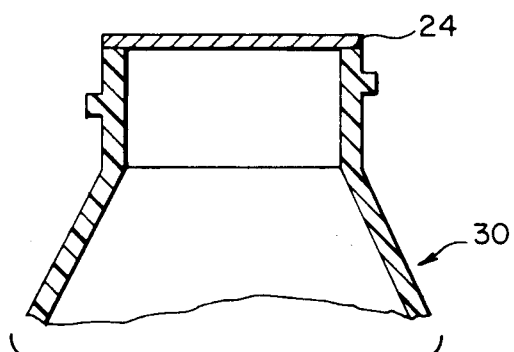

FIG. 4 shows the cap 10 and the container 30 after the cap 10 has been removed from the container 30 subsequent to the bonding step of the process. In the embodiment shown in FIG. 4, the backing layer 22 of the cap liner 20 is retained within the cap 10. The sealing layer 24 of the cap liner 20 remains affixed to the container 30 thereby hermetically sealing the open top 32 of the container 30. The bond layer 26 of the cap liner 20 is a mechanically releasable layer which is either peelable or shearable in the embodiment shown in FIG. 4. The bond layer 26 is separated from the backing layer 22 upon removal of the cap 10 from the container 30 after bonding.

Figure 5:
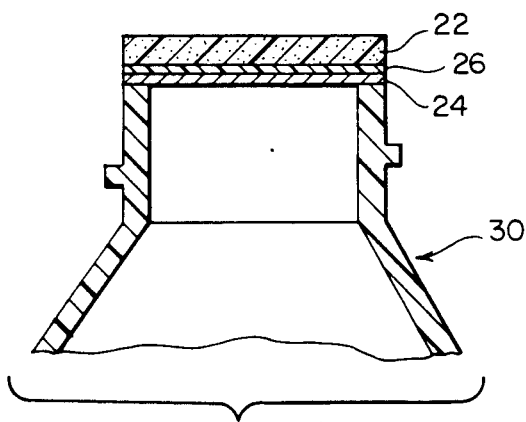
FIG. 5 is a cross sectional view of the cap and container after removal of the cap from the sealed container in another embodiment of the invention.

FIG. 5 shows an alternate embodiment of the present invention. In the embodiment shown in FIG. 5, the bond layer 26 of the cap liner 20 provides a permanent bond between the backing layer 22 and the sealing layer 24 instead of the mechanically releasable bond illustrated in FIG. 4. Thus, upon removal of the cap 10 from the container 30 in the embodiment shown in FIG. 5, the entire cap liner 20 functions as the hermetic seal for the container 30. In the embodiment of FIG. 5, no part of the cap liner 20 is retained within the cap 10 after the bonding step of the process and the subsequent removal of the cap 10 from the container 30.

The backing layer 22 of the cap liner 20 of the present invention is an extruded or coextruded thermoplastic material. As such, the backing layer 22 is not subject to delamination. The backing layer 22 may be a solid or foamed thermoplastic material. Extruded or coextruded thermoplastic materials suitable for use as the backing layer 22 include: low density polyethylene, medium density polyethylene, high density polyethylene, polyisobutylene, synthetic olefin rubber, ethylene vinyl acetate, polypropylene, surlyn or polyvinyl chloride (PVC). A preferred thermoplastic material useful as the backing layer 22 is a coextruded material comprising a foamed low density polyethylene core between two solid layers of polyethylene. The two solid layers of polyethylene can be high density polyethylene, low density polyethylene or another suitable thermoplastic material. The density of this preferred coextruded thermoplastic material may be from 15 to 50 lbs/cu ft.

The bond layer 26 can be a mechanically releasable layer which is either peelable or shearable and permits separation of the backing layer 22 from the sealing layer 24 after bonding of the sealing layer to the container 30. Alternately, the bond layer 26 can provide a permanent bond between the backing layer 22 and the sealing layer 24.

If the bond layer 26 is to function as a mechanically releasable layer between the backing layer 22 and the sealing layer 24, the bond layer 26 may be any known FDA-sanctioned chemical release agent.

If the bond layer 26 is to provide a permanent bond between the backing layer 22 and the sealing layer 24, the bond layer 26 is one of the following materials: low density polyethylene, surlyn, ethylene vinyl acetate or another suitable FDA-sanctioned adhesive.

The sealing layer 24 can be any material capable of effectively sealing the container 30. The choice of material for the sealing layer 24 will be, in part, dependent upon the nature of the contents of the container 30. The sealing layer 24 may be a metallic foil, such as aluminum foil, or the sealing layer 24 can be paper. In addition, the sealing layer 24 could comprise several layers including both a metallic foil layer and a paper layer. If necessary, a tie layer such as a thermoplastic film or coating could be provided between the layers of the sealing layer 24. Also, a tie layer could be provided on one surface of the sealing layer 24 to provide protection against the contents of the container 30 attacking or reacting with the primary material of the sealing layer 24. For example, a tie layer comprising a thermoplastic film or coating could be applied to the surface of an aluminum foil sealing layer 24 to prevent the contents of the container 30 from attacking or reacting with the aluminum foil.

In accordance with the present invention, at least a portion of the cap liner 20 is bonded to the upper edge 36 of the threaded neck 34 of a container 30. Thus, at least one layer of the cap liner 20 extends across the open end 32 of the container 30 after the bonding has been accomplished. The sealing layer 24 of the cap liner 20 can be bonded to the upper edge 36 of the threaded neck 34 of the container by any suitable means. Preferably, an adhesion layer is provided on the surface of the sealing layer 24 of the cap liner 20. The adhesion layer may be a pressure sensitive adhesive which requires no heat to adhere to the surface of the container 30. Alternately, the cap liner 20 could be glued on to the container 30 along the upper edge 36 of the threaded neck 34. Preferably, the sealing layer 24 of the cap liner 20 is secured to the container 30 by heat sealing. If the sealing layer 24 of the cap liner 20 is to be secured to the container 30 by heat sealing, the surface of the sealing layer 24 is coated with a film of a heat sealable material. Examples of suitable heat sealable materials include: low density polyethylene, surlyn, polypropylene, ethylene vinyl acetate or another suitable sealant material.

If the sealing layer 24 of the cap liner 20 is to be secured to the container 30 by heat sealing, a heat sealable coating or film is applied to the sealing layer 24 of the cap liner 20, the cap 10 having the cap liner 20 positioned therein is secured to the container 30, and the capped container 30 is subjected to heat sealing means. The heat sealing may comprise any suitable means such as electrical induction or conduction means.

Although the invention has been described in detail with reference to certain preferred embodiments thereof, it will be understood that modifications can be made without departing from the spirit of the invention as described above and as claimed below.

What is claimed is:

1. A cap liner for hermetically sealing a container having an open top, said cap liner comprising:
    A. a backing layer comprising a coextruded material consisting of foamed thermoplastic material sandwiched between two layers of solid thermoplastic material;
    B. a sealing layer comprising metallic foil having a coated surface and an uncoated surface, said coated surface of the metallic foil having a heat sealable adhesive coating thereon; and
    C. a bond layer positioned between one of the layers of solid thermoplastic material of the backing layer and the uncoated surface of the metallic foil of the sealing layer.

2. The cap liner of claim 1 wherein said backing layer comprises a foamed low density polyethylene sandwiched between two layers of solid polyethylene, and said metallic foil is aluminum foil.

3. The cap liner of claim 1 wherein the bond layer provides a mechanically releasable bond between the backing layer and the sealing layer.

4. The cap liner of claim 1 wherein the bond layer provides a permanent bond between the backing layer and the sealing layer.

5. The cap liner of claim 1 wherein the sealing layer further comprises paper.

* * * * *